US005521809A

United States Patent [19]
Ashley et al.

[11] Patent Number: 5,521,809
[45] Date of Patent: May 28, 1996

[54] CURRENT SHARE CIRCUIT FOR DC TO DC CONVERTERS

[75] Inventors: Donald J. Ashley, Endicott, N.Y.; Leonard J. Hitchcock, Montrose, Pa.; Michael J. Johnson, Raleigh, N.C.

[73] Assignee: International Business Machines Corporation, Armonk, N.Y.

[21] Appl. No.: 123,274

[22] Filed: Sep. 17, 1993

[51] Int. Cl.[6] .................................................. H02M 3/155
[52] U.S. Cl. .............................. 363/71; 307/82; 323/225
[58] Field of Search .................................. 363/71, 65, 17, 363/21; 323/272, 222, 225; 307/82

[56] References Cited

U.S. PATENT DOCUMENTS

| | | | |
|---|---|---|---|
| 3,675,114 | 7/1972 | Nercessian | 323/9 |
| 4,035,715 | 7/1977 | Wyman et al. | 323/4 |
| 4,195,333 | 3/1980 | Hedel | 363/21 |
| 4,257,070 | 3/1981 | Sommer et al. | 358/282 |
| 4,276,590 | 6/1981 | Hansel et al. | 363/71 |
| 4,308,468 | 12/1981 | Olson | 307/353 |
| 4,414,598 | 11/1983 | Nowell | 361/18 |
| 4,415,960 | 11/1983 | Clark, Jr. | 363/21 |
| 4,425,613 | 1/1984 | Shelly | 363/26 |
| 4,511,814 | 4/1985 | Matsuo et al. | 307/572 |
| 4,542,305 | 9/1985 | Blauschild | 307/353 |
| 4,609,828 | 9/1986 | Small | 307/44 |
| 4,618,779 | 10/1986 | Wiscombe | 307/60 |
| 4,635,178 | 1/1987 | Greenhalgh | 363/65 |
| 4,675,555 | 6/1987 | Okajima et al. | 307/455 |
| 4,717,833 | 1/1988 | Small | 307/44 |
| 4,734,844 | 3/1988 | Rhoads | 363/72 |
| 4,760,276 | 7/1988 | Lethellier | 307/18 |
| 4,766,364 | 8/1988 | Biamonte et al. | 323/272 |
| 4,856,023 | 8/1989 | Singh | 375/3 |
| 4,866,295 | 9/1989 | Leventis et al. | 307/43 |
| 4,877,972 | 10/1989 | Sobhani et al. | 307/43 |
| 4,924,170 | 5/1990 | Henze | 323/272 |
| 4,939,393 | 7/1990 | Petty | 307/475 |
| 5,010,470 | 4/1991 | Lipman et al. | 363/132 |
| 5,014,179 | 5/1991 | Latos | 363/56 |
| 5,023,746 | 6/1991 | Epstein | 361/56 |
| 5,027,255 | 6/1991 | Zeitlin et al. | 361/395 |
| 5,036,452 | 7/1991 | Loftus | 363/71 |
| 5,043,603 | 8/1991 | Ohba et al. | 307/455 |
| 5,051,608 | 9/1991 | Ten Pierick et al. | 307/261 |
| 5,087,871 | 2/1992 | Losel | 323/299 |
| 5,136,183 | 8/1992 | Moyal et al. | 307/355 |
| 5,142,168 | 8/1992 | Matsunaga | 307/446 |
| 5,157,269 | 10/1992 | Jordan et al. | 307/59 |
| 5,164,890 | 11/1992 | Nakagawa et al. | 363/65 |
| 5,200,643 | 4/1993 | Brown | 307/53 |
| 5,204,809 | 4/1993 | Andresen | 363/132 |
| 5,376,830 | 12/1994 | Ashley et al. | 327/134 |
| 5,428,523 | 6/1995 | McDonnal | 363/71 |

FOREIGN PATENT DOCUMENTS

| | | |
|---|---|---|
| 524425 | 6/1992 | European Pat. Off. . |
| 63-29976 | 7/1988 | Japan . |
| 2012501 | 1/1978 | United Kingdom . |

*Primary Examiner*—Peter S. Wong
*Assistant Examiner*—Adolf Berhane
*Attorney, Agent, or Firm*—Arthur J. Samodovitz; William H. Steinberg

[57] ABSTRACT

A matched pair of npn transistor configured as emitter followers provide high impedance isolation for input error voltage busses in the current share circuitry used with parallel connected current programmed dc to dc converters. The matched emitter followers offer the bus isolation of buffer amplifiers but do not add the detrimental offset voltage to the input error signals. Trimmable current sinks are connected to the emitters of the transistors to guarantee equal VBE drops. Slight intentional unbalancing can be introduced using the current sources to improve stability. The current share circuitry equalizes main FET switching currents not load currents reducing FET stresses. A programmable differential amplifier is provided which can accommodate different regulator output voltages. Diagnostic circuitry monitors share circuitry operation.

8 Claims, 3 Drawing Sheets

CURRENT SHARE CIRCUIT FOR DC TO DC CONVERTERS

CROSS REFERENCE TO RELATED APPLICATIONS

The present application is related to copending applications Ser. No. 08/124,323 filed by D. J. Ashley et al. on Sep. 17, 1993 entitled "High Frequency Slope Compensation Circuit" and Serial No. 08/124,516 filed by D. J. Ashley et al. on Sep. 17, 1993 entitled "Electronic Switch Having Programmable Means To Reduce Noise Coupling" both assigned to the same assignee as the present invention and both incorporated by reference herein.

BACKGROUND OF THE INVENTION

The present invention relates to DC to DC converters operating in parallel with one another and sharing load currents.

Current sharing allows a distribution of load current amongst a number of parallel DC to DC converters to increase the current and power delivery to a load by having each of the converters contribute. Current sharing improves the system transient response by spreading the load current over all paralleled converters and improves reliability by reducing their individual power dissipation. With current sharing, each parallel converter contributes approximately a 1/N+1 portion of the load current, when there are a total of N+1 paralleled converters with a minimum of N converters required for providing maximum load current. One converter does not have to contribute a disproportionate amount or reach a current limit before other parallel converters contribute. If one of the paralleled converters should fail, the load current is distributed among the remaining converters and the system continues to operate.

Current sharing can be based on the output current of each of the DC to DC converters or can be based on the current carried by each of the switching devices in each of the converters. When output current or load current is monitored, an output sense resistor is used in each of the paralleled regulators. The load resistor dissipates considerable amounts of power when the converters provide high output currents. Also, with different input voltages supplied to the parallel converters, the main switching transistors of the converters can conduct significantly different currents while each supplying the same output current. Monitoring and controlling the currents in the main switching devices of the converters results in equalizing power device stress which increases system reliability. Balancing the currents in the main switching devices balances the output load currents with each of the converters sharing the load.

In previous systems attempting to accomplish load sharing, buffer amplifiers shown in FIG. 1 by reference numeral 3, 4, and 5 were used to isolate the local and master error bus impedances from the input of a differential amplifier 6. In a master-slave control, the error from one of the converters is used to provide an error signal to all the parallel connected converters. The output of the differential amplifier 6 was used to adjust the value of the voltage reference adjust signal which adjusted the local error signal of each of the converters upwards to meet the value of the master error voltage, so that with all the error signals equivalent, the main power devices of each of the converters will be equivalent. The buffer amplifiers are necessary to isolate the differential amplifier from changing bus impedance which occurs with a differing number of parallel converters and could affect the gain of the differential amplifier. A problem arises with the use of buffer amplifiers due to the voltage offset error inherent in buffer amplifiers. The input offset voltage in the buffer amplifiers of moderate complexity can be as high as 40 mV and varies with temperature and over the life of the device. This results in an uncontrollable offset being added to the error signals by the isolation stage which detracts from the accuracy of the stress sharing system, resulting in inaccurate adjustments to the error signals. The differential amplifier can have a high gain sufficient to provide large inaccuracies due to amplified offset being present at the output of the differential amplifier. This leads to poor system reliability and uneven distribution of load currents and uneven power dissipation by the converter switching devices.

The use of higher complexity buffer amplifiers with extremely low offset voltages adds cost to the integrated circuit and still leaves an undesired offset.

It is an object of the present invention to provide current sharing circuitry which allows precision load current distribution among parallel connected converters.

It is another object of the present invention to provide current sharing circuitry that provides a buffering solution for buffering shared error signals that results in lower cost and higher accuracy than a high complexity buffer amplifier with low offset voltages.

SUMMARY OF THE INVENTION

In one aspect of the present invention a plurality of DC to DC converters for use in an N+1 system is provided with each converter connected to a shared bus. A switching transistor controls the transfer of power from the input to the output of each of the DC to DC converters. A voltage proportional to peak current flowing through said switching transistor is generated. Share control circuit means coupled to the output of each of the DC to DC converters and coupled to a predetermined reference voltage generates a local error voltage for pwm peak current control, the largest local error voltage of the plurality of DC to DC converters provides the global error voltage carried by the shared bus. The local error voltage of each of the DC to DC converters is adjusted to substantially match the global error voltage. The voltage signal proportional to peak switching transistor current is compared to the local error voltage and limits the switching current to a peak proportional to the local error voltage, so that the peak transistor current of the plurality of switching transistors is equalized.

In another aspect of the present invention, a method of trimming a silicon matched pair of transistors emitter followers providing local and global error voltages to a differential amplifier in a current share circuit is provided. The emitter followers base emitter voltage drops are adjusted so that when the local and global error are equal, the local error voltage provided to the differential amplifier is greater than the global error voltage, so that stability is improved.

DETAILED DESCRIPTION OF THE INVENTION

Figure 2:
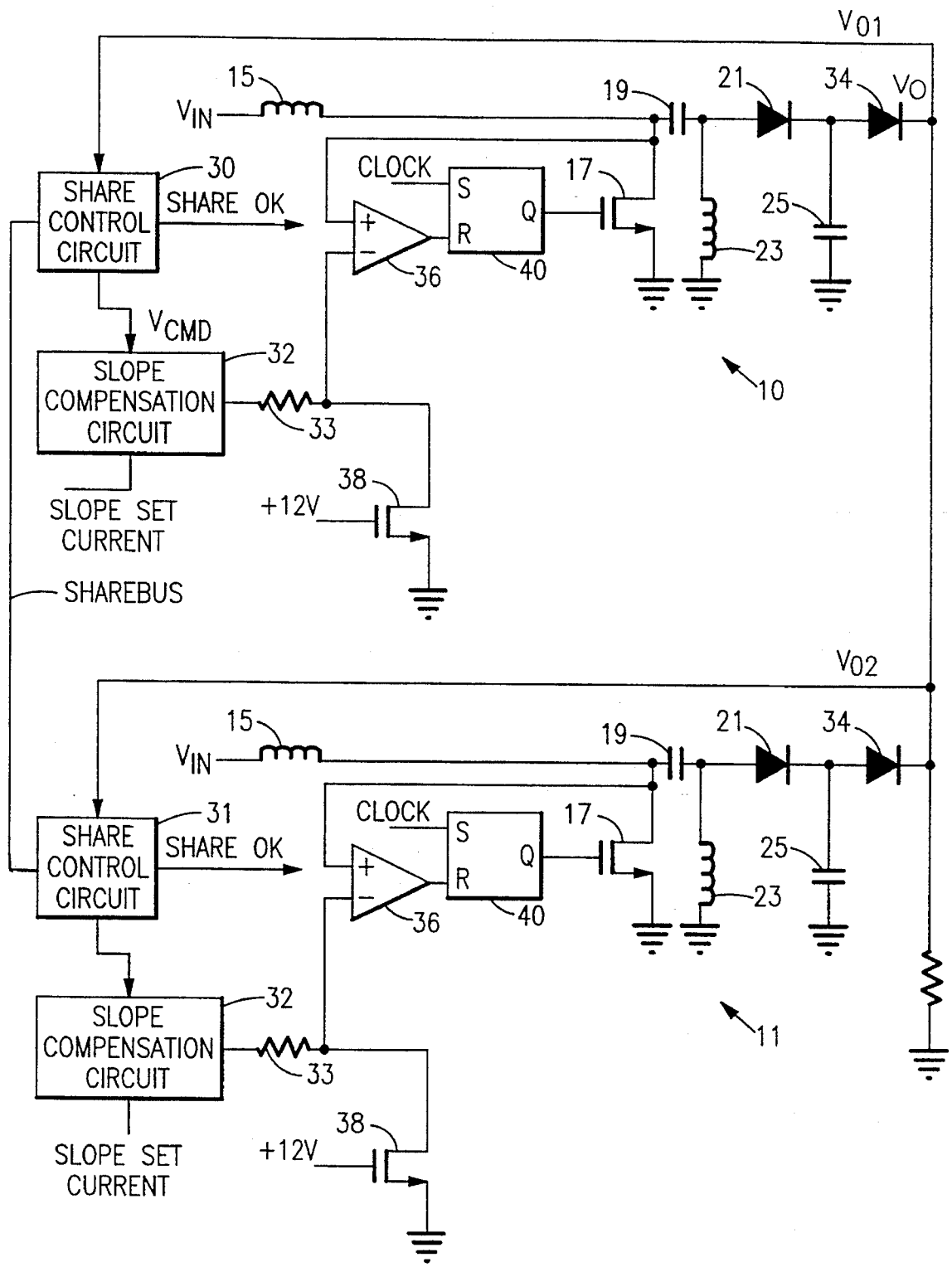
FIG. 2 shows a part block diagram part schematic representation of parallel converters connected to share current according to the present invention.

Referring now to FIG. 2 two parallel connected current-programmed single-ended primary inductance converters (SEPIC) 10 and 11 are shown. While two parallel converters are shown any number of parallel converters greater than one can be connected in parallel. Converters 10 and 11 are the same. A DC input voltage is provided at $V_{in}$ through an inductor 15 and through an N-channel FET 17 to ground, with the source of the FET connected to ground. The input voltage for each of the converters 10 and 11 can come from a different source or sources to improve reliability. The junction of inductor 15 and FET 17 is connected through a capacitor 19 and a diode 21 to the output of the converter $V_o$, with the anode of diode 21 connected to capacitor 19. The junction of capacitor 19 and diode 21 is connected through an inductor 23 to ground. The cathode of the diode 21 is connected through an output capacitor 25 to ground. The output voltage $V_o$ of each of the converters is connected through a diode 34 to provide a diode OR dotted output which prevents failed units from grounding the output voltage $V_o$ and allows any of the converters that fail to be removed and replaced while the other converters still operating. The term diode OR dotted is used to refer to the connection of several outputs through separate diodes with the outputs of the diodes connected (OR dotted) together. Each of the converters 10 and 11 has corresponding share control circuits 30 and 31, respectively, which receives the output voltage $V_o$ and provides a buffered error voltage, which is provided to slope compensation circuit 32 and then through a resistor 33 to the inverting input of a high speed comparator 36. The inverting input of comparator 36 is also connected through an N-channel FET drain pilot transistor 38 to ground. The gate of FET 38 is connected to a voltage source so that FET 38 is always conducting. The drain pilot transistor 38 is integrated into the same region of the semiconductor layer of transistor 17. Consequently, as the transistor 17 heats up due to load current, the pilot transistor 38 heats up to substantially the same temperature. The pilot transistor 38 provides a variable resistance which tracks the changes in resistance in transistor 17. Since the voltage drop across transistor 17 is being monitored to determine the current through transistor 17, adjusting for changes in resistance in transistor 17 permits accurate current sensing. An example of a temperature monitoring pilot transistor is shown in copending application Ser. No. 07/782,833, filed Oct. 24, 1991, entitled "Temperature Monitoring Pilot Transistor" and assigned to the same assignee as the present invention. Ser. No. 07/782,833 is hereby incorporated by reference. The drain of FET 17 is connected to the noninverting input of comparator 36. The output of the comparator 36 is connected to the reset input of a set/reset flip flop 40. A clock signal is connected to the set input of flip flop 40. The noninverted output Q of the flip flop is connected to the gate of FET 17. The main power transistor 17 switching is controlled by a pwm current mode controller which generates a current threshold for determining when to switch the main power transistor 17 in the corresponding converter. This is achieved by comparing the voltage drop across the pilot transistor 38 connected to the error voltage output of the share control circuit 30, 31 modified by the slope compensation circuitry 32 and fed through resistor 33, to the voltage drop across transistor 17. The current threshold determines pulse width by determining the on-time of transistor 17. Share control circuits 30 and 31 are each connected to a bus labelled SHAREBUS which has the global error voltage, which is the largest local voltage error of all the parallel converters. The SHAREBUS is connected to ground through a pull-down resistor 35 to ground. The current share circuits in blocks 30 and 31 are all the same and the circuitry in one of the blocks is shown in more detail in FIG. 3. The outputs of all the converters are connected to one another through their respective diodes 34, to provide a common output $V_{out}$.

Figure 3:
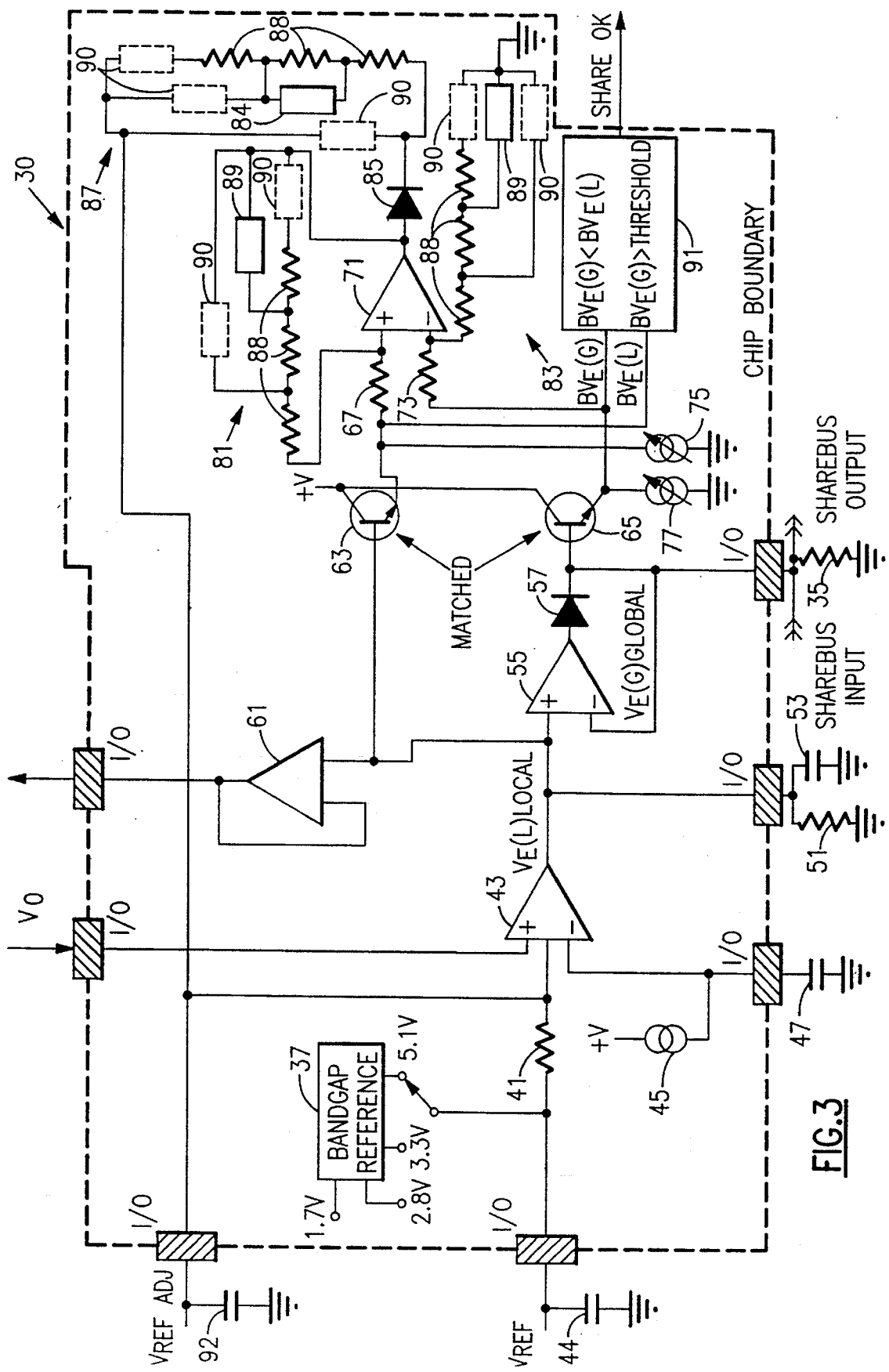
FIG. 3 is a schematic representation of one of the share control circuits of FIG. 2 in more detail.

Referring now to FIG. 3, a bandgap reference 37, which can be metal masked programmed during fabrication to have any one of several voltages depending on the technology the control circuitry is to be used with, is connected through a resistor 41 to a noninverting input of a transconductance amplifier 43 which serves as an error amplifier. The bandgap reference 37 voltage is also available for measurement off chip across a filter capacitor 44. The output voltage $V_o$ is connected to an inverting input of error amplifier 43 which provides the local error voltage of the current share circuitry. A current source 45 is connected at one end of a capacitor 47, which is located off chip and is also connected to an inverting input of the error amplifier 43 to provide a voltage ramp for soft start control. The other end of the capacitor 47 is connected to ground. The output of error amplifier 43 is connected through a parallel connected resistor 51 and capacitor 53 to ground and to the noninverting input of an operational amplifier 55 to provide frequency compensation. The output of operational amplifier 55 is connected to the anode of a diode 57. The cathode of diode 57 is connected to the inverting input of operational amplifier 55 forming a unidirectional buffer. The cathode of diode 57 is also connected to a bus labelled SHAREBUS which is connected to all the share control circuits of the parallel connected converters and provides the global error voltage. The SHAREBUS is connected through a pull-down resistor 35 to ground. The output of the error amplifier 43 is connected through a buffer 61 to the slope compensation circuitry 32 and the output is imposed across resistor 33 to generate the programmed current threshold for the main power FET 17. The output of error amplifier 43 is also connected to the base of an npn transistor 63. The cathode of diode 57 is connected to the base of an npn transistor 65 which is silicon matched to npn transistor 63. The emitter of transistor 63 is connected through a resistor 67 to the inverting input of differential amplifier 71 and the emitter of transistor 65 is connected through a resistor 73 to the noninverting gate of differential amplifier 71. Trimmable current sources 75 and 77 are connected to the emitters of transistors 63 and 65, respectively. The differential amplifier 71 has a variable feedback resistance 81 connecting the output of the differential amplifier 71 to the inverting input. A variable resistance 83 is connected between the noninverting input and ground. The output of differential amplifier 71 is connected to the anode of a diode 85. The cathode of diode 85 is connected through a variable resistance 87 to the noninverting input of the error amplifier 43. The voltage at the noninverting input of the error amplifier is available off the chip, across filter capacitor 92. The variable resistances 81, 83, and 87 are fabricated from a long strip of diffusion resistor material 88 having a number of via contact connections. The rectangular blocks 89 represent metallized shorts while the blocks 90 with the dashed sides represent opens which do not complete an electrical circuit. The metallized opens 90 and shorts 89 are determined by the metal mask used during fabrication to select the variable resistances and bandgap reference voltage 37, thereby select gain and proper adjustment of the reference voltage being applied to the error amplifier. Alternatively, the variable resistances could be implemented using resistors which are laser trimmed to achieve improved precision resistances. A diagnostic block 91 has one input connected to the emitter of transistor 63 and another input connected to the emitter of transistor 65 and provides a signal labelled SHAREOK when at a logical high level is indicative of proper current sharing operation of the share circuitry.

Referring now to FIGS. 2 and 3 the operation of the parallel converters 10 and 11 will now be described. The current programmed converters have their power device current set by a programmed threshold which is generated from an error voltage. Parallel operation of multiple converters is achieved by tying the regulated outputs together as well as the SHAREBUS outputs. While two converters are shown, the share control circuit will work without connecting any converters in parallel or with more than two converters connected in parallel. Transconductance amplifier 43 serves as the error amplifier with an off-chip RC network 51 and 53 connected to ground for implementing frequency compensation and providing an error voltage from the current output of the transconductance amplifier 43 to program the current of power device 17. Tying the error voltage signals of paralleled current programmed converters together by way of the SHAREBUS ensures that all converters are programmed to the same FET current and allows the converter stresses to be shared. The failure of any single converter does not interfere with the output voltage provided by the tied together converter outputs, since the number of parallel converters is at least one more than that necessary to provide the anticipated load. The present invention allows for concurrent maintenance, with any single failed converter being replaceable while the other converters are still operating. When a converter is replaced in an operating group of converters the new converter will begin operating to share the load with the other converters, hence distributing the stresses among them.

Referring now to FIG. 3, the stress share circuitry for one of the converters of FIG. 2 is shown in more detail. Error amplifier 43 compares the output voltage $V_o$ to a local reference voltage to generate a local error voltage signal Ve(L). The reference voltage is provided by bandgap reference 37. This reference voltage is subject to adjustment by a feedback signal $V_{REF}$ ADJ which will be discussed more fully hereinafter. The reference voltage from the bandgap reference without modification is accessible off chip for test purposes. A capacitor 44, located off chip, is connected between the voltage reference signal and ground to provide noise filtering. A buffered copy of the local error voltage signal is diode-OR-dotted onto a shared bus labelled SHAREBUS. The shared bus is also connected to buffered copies of the other local error voltage signals from the other converters. Diode-OR-dotted refers to the connection of a number of signals after each signal first passes through a respective diode and the output of all the diodes are connected (dotted) together. Diode-OR-dotted connections maintain the highest error voltage signal in the system of paralleled converters using the shared bus since the highest error voltage signal reverse biases the diodes through which the other lower error voltage signals need to pass to reach the bus. The highest local error voltage signal which is forwarded onto the shared bus is called the global error voltage Ve(G). The difference between the different local error voltages and the global error voltage signal is the basis for sharing by adjustment of the reference voltage which is provided to the error amplifier 43. This in turn alters the different local error voltage such that they track the global error voltage level. The local error voltage is supplied to the slope compensation circuitry for generation of a programmed current threshold which determines the on-time of the main switching transistor of the converter.

Before the local error voltage and the global error voltage can be compared, however, an isolating buffer is needed to ensure that changes in the bus impedance which can occur due to changes in the number of parallel converters, does not effect the impedance of the components used to establish the gain of the sharing amplifier. Changes in the number of parallel converters can occur when one of the converters fails or when a failed converter is replaced, both of which can occur during operation of the other converters. In the present invention a silicon matched pair of emitter followers 63 and 65 with trimmable current sinks 75 and 77 connected to their emitters are provided. The adjustable current sinks allow trimming the offset of the additive base emitter drops (Vbe) during an initial chip test. The matched emitter followers 63 and 65 provide the required bus isolation of prior art buffer amplifiers but do not add a detrimental offset voltage to the error signals supplied to the differential amplifier. Offset voltages of buffer amplifiers vary with temperature and age and the offset voltages do not necessarily vary in the same manner with one another. In the present invention the base emitter drops are adjustable and track one another with temperature and age. Therefore, the local and global error voltages will be matched replicas of the magnitude of the error signals being presented at the input busses to the isolation stages. Hence, precision load current distribution can be realized resulting in a much higher system reliability than previously achievable. The stress sharing accuracy is best when the offset voltages from the isolation stages are balanced, however, some intentional unbalancing by biasing in favor of the local error voltage prevents noise on the globally routed bus from being amplified and causing unwanted adjustments to the voltage reference supplied to the error amplifier, particularly in the converter having the highest local error voltage signal. In any group of parallel connected converters, at any particular time, one of the local error voltages will become the global error voltage. For that converter, the global error voltage and local error voltage supplied to the differential amplifier 71 will be equal. In this situation, no change to the reference voltage is desired. To assure that no change occurs during chip test after fabrication, the trimmable current sources 75 and 77 are adjusted so that the voltage at the negative input of the differential amplifier where the buffered local error voltage is supplied is made slightly greater than the voltage at the noninverting terminal while equal voltages are provided to the bases of the npn transistors. The diode 85 connected at the output of the differential amplifier 71 assures that no adjustment is provided to the reference voltage when the inverting input is greater than the noninverting input. The diode 85 also assures that the reference voltage can only be adjusted higher, never pulled lower. It is the positive output voltage provided by the output of differential amplifier 71 balanced between output resistance 87 and reference resistor 41 to the input of transconductance amplifier 43 that allows the local error signals of the converters to be adjusted upward to approach the value of the predominant error voltage (global error voltage) that commands the shared bus input. When all the error signals are equivalent, the main power devices peak FET currents will be equivalent (with some slight tolerance error).

The output of differential amplifier 71 is a voltage that is equal to the gain of amplifier 71 multiplied by the difference between the local and global error voltages. This output voltage is resistor coupled through resistance 87 to the reference input of the error amplifier 43, and voltage divided by reference resistor 41 to the band gap reference voltage. This has the effect of increasing the reference voltage of any converter which has less than its share of FET current stress. This occurs because the precision reference voltage feeding the error amplifier is resistor coupled via resistor 41 and a voltage divider is formed with resistance 87. As the output voltage from differential amplifier 71 increases the reference voltage to the error amplifier 43 follows as does the output local error voltage. The voltage reference adjustment from amplifier 71 is also available off chip to assist in testing the chip. Capacitor 92, located off chip, is connected between the voltage reference adjustment and ground, and provides noise filtering and frequency compensation for differential amplifier 71.

The gain of differential amplifier 71 is adjustable by means of variable resistances 81 and 83, coupling resistor 87 is also a variable resistance. The precision reference 37 as well as the variable resistances 81, 83, and 87 are all programmable to accommodate different output voltages and stress sharing capabilities. This adjustment capability can be performed by modifications to the metal mask used to fabricate the chips by leaving components in the circuit or shorting them with connections available in the metal masks to allow share control circuitry for use with different voltages to be economically provided.

During start up, it is not desirable to attempt to provide current sharing between the parallel connected converters. Capacitor 47 is initially discharged and when circuit operation begins, capacitor 47 is charged by current source 45. Transconductance amplifier 43 is designed to follow the voltage across capacitor 47 provided at one of its inverting inputs while disregarding the other inputs to the transconductance amplifier until the capacitor 47 voltage reaches the reference voltage value. Once this predetermined value is reached, the input from capacitor 47 is ignored and the difference between the reference voltage as modified by the feedback from differential amplifier 71 and the output voltage $V_o$ is amplified and provided at the output of amplifier 43 as a current. The voltage developed across resistor 51 by the output current of amplifier 43 is provided to operational amplifier 55 and is the local error voltage signal that will be applied onto the SHAREBUS if it is greater than the other parallel regulator's local error voltage.

The stress share circuitry also offers diagnostic monitoring in block 91 of its own operation, providing an output that interfaces with the system microcontroller (not shown) which can be part of a larger system, such as a direct access storage device (DASD) system to which the parallel connected converters provide power or drives an LED. The diagnostic circuitry in block 91 compares the local and global error voltages plus the base emitter drops introduced by transistors 63 and 65 presented at the input of differential amplifier 71 and signals the system whenever the global error voltage is less than the local error voltage or if it exceeds an upper threshold. The global error voltage can be equal to the local error voltage during stand alone operation of a single converter or if it is the dominant converter, but it should never be less than the local error voltage. The upper threshold corresponds to the point at which the FET current is at maximum operating capability. Either of these two conditions will send an interrupt signal on the line labelled SHAREOK to indicate improper stress sharing operation by causing SHAREOK to be connected to ground. The SHAREOK signal is driven by an open drain NMOS transistor that is capable sinking 20 mA, so that an LED may be used in applications where a visual indication is preferred. In addition to providing real time monitoring of the load current share circuitry, enhanced chip testability during the wafer probe testing stage is possible.

Figure 1:
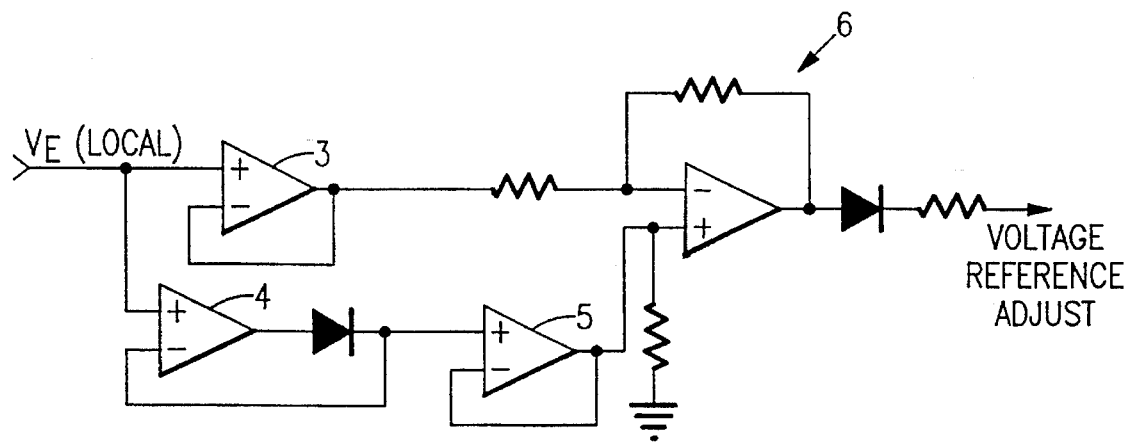
FIG. 1 shows a prior art circuit arrangement for providing buffering of a master error voltage signal and local error voltage signal to a differential amplifier.
Figure 4:
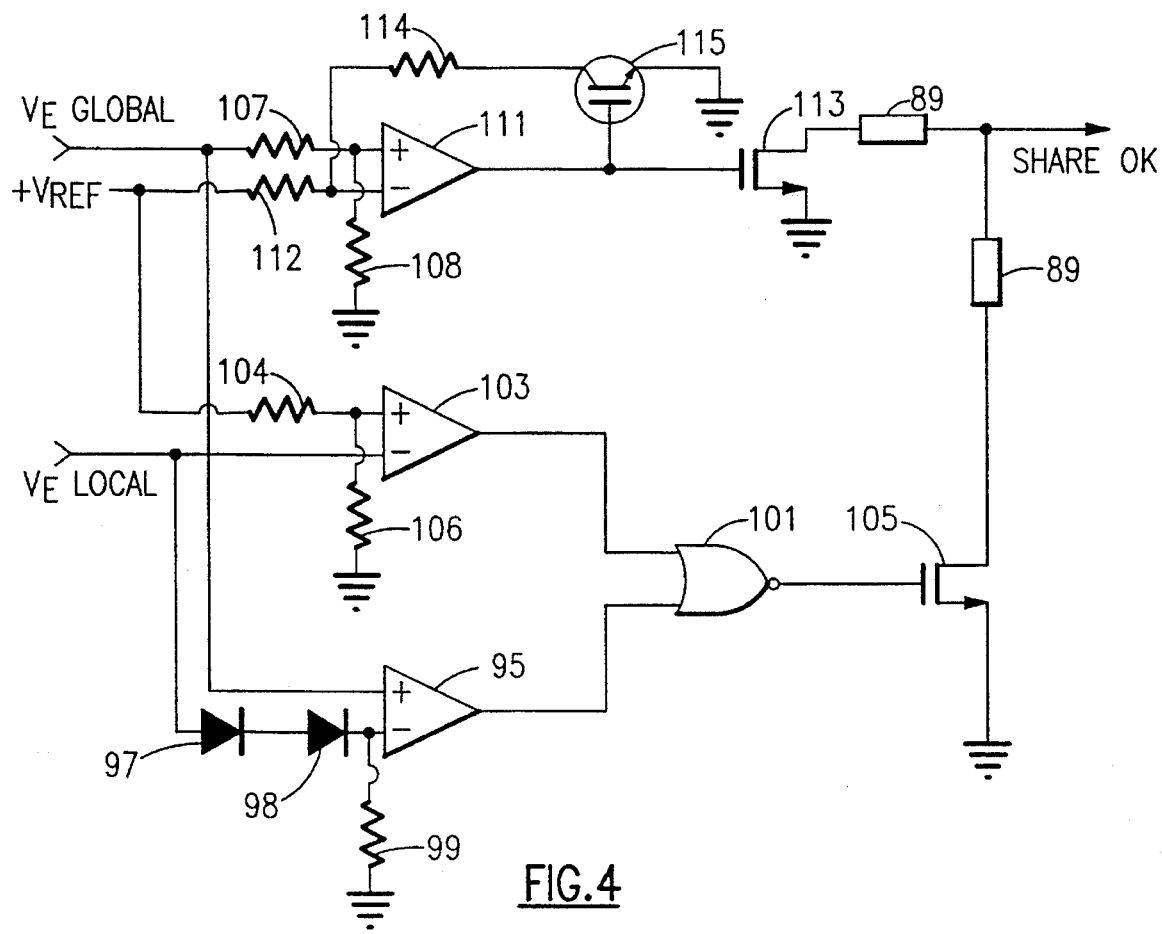
FIG. 4 shows diagnostic monitoring circuitry of FIG. 3.

The diagnostic monitoring is shown in more detail in FIG. 4. The global error voltage and the local error voltage signals can change very rapidly due to a quick load current change causing an instaneous response from the error amplifier. The unidirectional buffer shown as operational amplifier 55 and diode 57 in FIG. 3, introduces a delay in the path of the global error voltage signal which can cause an erroneous determination by the diagnostic circuit if compensation for the delay is not provided. In FIG. 4, the local and global error voltage signals are compared in a comparator 95 after the local error voltage signal has been reduced by a predetermined voltage. The global error voltage signal connected to the noninverting input of comparator 95 and the reduced local error voltage connected to the inverting input of comparator 95. Series connected diodes 97 and 98 are connected to the inverting input of comparator 95 to provide the voltage reduction. A resistor 99 connects the inverting input of comparator 95 to ground to pull down the voltage at the comparator input to prevent it from floating. The reduced voltage compensates for the delay in the global error voltage signal. When the local error voltage signal, reduced by a predetermined value, is greater than the global error voltage signal, the output of comparator 95 is low. The output of comparator 95 is connected to one input of a NOR gate 101. If the local error voltage is less than a predetermined quantity then the converter is not operating and the relative voltages of the local error voltage and global error voltage is not significant. If the local bus voltage connected to the inverting input of a comparator 103 is less than a predetermined quantity determined by the resistor 104 connected in series with a resistor 106 and a voltage reference and the noninverting input of comparator 103, then the output of comparator 103 is high. The output of comparator 103 is coupled to the other input of NOR gate 101. The output of NOR gate 101 is connected to the gate of an N-channel FET 105. The output of NOR gate 101 is only high when the local error voltage signal is greater than a predetermined minimum voltage and the local error voltage, less a predetermined voltage, is greater than the global error voltage. The high output of the NOR gate 101 biases FET 105 into conduction, causing the output signal of the diagnostic circuit labelled SHAREOK to be connected to ground by FET 105. The global error voltage signal is also connected through a resistor 107 to the noninverting input of a comparator 111. A resistor 108 connects the inverting input to ground. Resistor 107 and 108 act as a voltage divider reducing the voltage supplied to the comparator 111. A predetermined threshold voltage is determined by resistor 112 connected between a voltage source and the inverting input of comparator 111 and by a hysteresis resistor 114 connected at one end to the inverting input of comparator. The other end of resistor 114 is connected to the drain of an N-channel FET 115. The gate of FET 15 is connected to the output of the comparator and the source is connected to ground. When the global error voltage signal exceeds the predetermined threshold voltage, the output of comparator 111 is high. The output of comparator 111 is connected to the gate of an N-channel FET 113, which when biased into conduction connects the SHAREOK signal to ground and reduces the voltage on the inverting input of comparator 111 to eliminate noise from causing further output changes. Metallizes shorts 89 in series with the drains of FETs 105 and 113 allow one or the other or both of the diagnostic criteria to be selected by the appropriate choice of the metal mask used during fabrication. Since a metallized short is shown is series with the drains of FETs 105 and 113 both diagnostic criteria have been implemented in the embodiment shown in FIG. 4.

The foregoing has described current sharing circuitry which allows precision load current distribution among parallel connected converters.

While the invention has been particularly shown and described with reference to a preferred embodiment thereof, it will be understood by those skilled in the art that various changes in form and details may be made therein without departing from the spirit and scope of the invention.

What is claimed is:

1. A composite power converter comprising a plurality of DC to DC converters connected in parallel and supplying a common output, each converter comprising:

an inductor and an associated transistor for controlling current through said inductor and thereby controlling power through said each converter;

means for generating a local error voltage based on an output of said each converter and a reference voltage to control switching of said associated transistor;

first and second matched transistors arranged as emitter followers, means for applying said local error voltage to a base of said first transistor, means for applying the largest local error voltage of said plurality of converters to a base of said second transistor;

means for sensing a difference between outputs of said first and second transistors; and means for adjusting said local error voltage of said each converter based on said difference to approach said largest local error voltage.

2. A composite power converter as set forth in claim 1 further comprising:

first and second trimmable current sources coupled to emitters of said first and second transistors, respectively, for matching base to emitter voltage drops of said first and second transistors to each other.

3. A composite power converter as set forth in claim 1 wherein the difference sensing means comprises a differential amplifier having first and second inputs coupled to the emitters of said first and second transistors, respectively.

4. A composite power converter as set forth in claim 1 wherein the means for applying the largest local error voltage of said plurality of converters to a base of said second transistor comprises a diode having an anode coupled to receive said local error voltage of said each converter and a cathode coupled to a base of said second transistor and a source of said largest local error voltage.

5. A composite power converter as set forth in claim 4 further comprising means for applying all of the local error voltages of said plurality of converters to a common bus such that said bus exhibits said largest local error voltage, said bus being connected to said base of said second transistor.

6. A composite power converter as set forth in claim 1 wherein said reference voltage comprises a ramping voltage.

7. A composite power converter as set forth in claim 1 further comprising means for determining and providing an error signal when said largest local error voltage is less than said local error voltage of said each converter.

8. A composite power converter as set forth in claim 1 further comprising means for comparing a voltage proportional to peak current across said associated transistor to said local error voltage of said each converter and limiting said peak current such that peak currents of said associated transistors in said plurality of converters are approximately equal.

* * * * *